United States Patent [19]

Morikawa et al.

[11] Patent Number: 5,400,310
[45] Date of Patent: Mar. 21, 1995

[54] TRAY LOADING DEVICE OF A CD PLAYER

[75] Inventors: Kiyoshi Morikawa; Atsushi Kurosawa; Tomomichi Kimura; Toshirou Yamashita; Manabu Kiyota, all of Saitama, Japan

[73] Assignee: Pioneer Electronic Corporation, Tokyo, Japan

[21] Appl. No.: 116,951

[22] Filed: Sep. 7, 1993

[30] Foreign Application Priority Data

Sep. 11, 1992 [JP] Japan .................. 4-269529

[51] Int. Cl.6 .............. G11B 33/02; G11B 5/027; G11B 15/68
[52] U.S. Cl. .................. 369/75.2; 360/85; 360/92
[58] Field of Search ............ 369/75.2, 77.1, 34, 369/36, 38, 191, 192; 360/92, 85, 95

[56] References Cited

U.S. PATENT DOCUMENTS

| 4,688,695 | 8/1987 | Hirohata | 369/75.2 |
| 4,701,900 | 10/1987 | Hasegawa et al. | 369/36 |
| 5,063,553 | 11/1991 | Suzuki et al. | 369/77.1 |
| 5,136,563 | 8/1992 | Takemasa et al. | 369/36 |

Primary Examiner—Stuart S. Levy
Assistant Examiner—Allen Cao
Attorney, Agent, or Firm—Nikaido, Marmelstein, Murray & Oram

[57] ABSTRACT

A tray loading device has a fixed gear, a first gear coaxial with the fixed gear, and a first arm integral with the first gear. A second gear is rotatably mounted on the first arm and engaged with the fixed gear so as to revolve around the fixed gear. A third gear is rotatably mounted on the first arm and engaged with the second gear. A second arm is secured to the third gear. The second arm has a tray guide provided at an end portion thereof so as to be engaged with one of trays in a magazine. The tray guide is moved along a guide as the first and second arms rotate so as to draw the tray from the magazine.

3 Claims, 5 Drawing Sheets

TRAY LOADING DEVICE OF A CD PLAYER

BACKGROUND OF THE INVENTION

The present invention relates to a tray loading device of a CD player having a magazine which stores a plurality of trays each of which holds a compact disc (CD).

Recently, a CD player having a magazine has been provided for continuously reproducing a plurality of CDs.

In a car CD player, a tray loading device is designed so as to be vertically moved along the magazine for loading a selected tray in the magazine. The tray is drawn by the device from the magazine in the horizontal direction to feed the CD on the tray to a playback position.

FIG. 5 shows a conventional tray loading device comprising an arm rotating mechanism. The device comprises a gear 7 rotated by a motor (not shown), an arm 6 coaxially mounted on the gear 7 and having a fork 5 provided on an end thereof. A tray loading guide 3 is engaged with a notch 2 of a tray 1 and slidably mounted on a guide rail 4 at a lower portion thereof. The fork 5 of the arm 6 is slidably engaged with a projection 3a of the guide 3.

In operation, when the arm 6 is pivoted, the guide 3 is moved on the rail 4 through the fork 5 engaged with the projection 3a. Since the guide 3 is engaged with an inner wall of the notch 2, the tray 1 is drawn from the magazine or returned to the magazine.

However, in the device, the arm 6 having a long length is laterally disposed adjacent to the side of the magazine with a large space. Accordingly, the CD player can not be reduced in size.

On the other hand, when the tray to be reproduced is changed, the loading device is vertically moved along the trays in the magazine to a desired tray. When the device is vertically moved, if the guide 3 is engaged with the notch 2 of the tray 1, the guide may be caught by the edge of the notch. If the guide engages with the wall of the notch, the loading device may not be vertically moved. Therefore, it is necessary to disengage the guide 3 from the notch 2. In the conventional device, after the tray 1 is returned to the magazine, the gear 7 is rotated in the reverse direction by the motor so as to disengage the guide 3 from the notch 2.

Such a reverse operation of the gear complicates the control of the device.

SUMMARY OF THE INVENTION

An object of the present invention is to provide a tray loading device of a CD player which is small in size.

Another object of the invention is to provide a tray loading device where the operation of the device for removing a guide member from a notch is simplified at the change of the CD.

According to the present invention, there is provided a tray loading device of a CD player having a magazine storing a plurality of trays each of which holds a CD, the loading device comprising a fixed gear, a first gear coaxial with the fixed gear, a first arm integral with the first gear, a second gear rotatably mounted on the first arm and engaged with the fixed gear so as to revolve around the fixed gear, and a third gear rotatably mounted on the first arm at an end portion thereof and engaged with the second gear.

A second arm is secured to the third gear, and a tray guide is provided on the second arm at an end portion thereof so as to be engaged with one of the trays.

Guide means is provided for moving the tray guide along a line. When the first gear is rotated by driving means, the first and second arms are reversely rotated so as to draw out the tray from the magazine.

In an aspect of the invention, the length of the first arm is equal to a length of the second arm, and the number of teeth of the second gear is half of that of the fixed gear.

Other objects and features of this invention will become understood from the following description with reference to the accompanying drawings.

DETAILED DESCRIPTION OF THE PREFERRED EMBODIMENT

Figure 1:
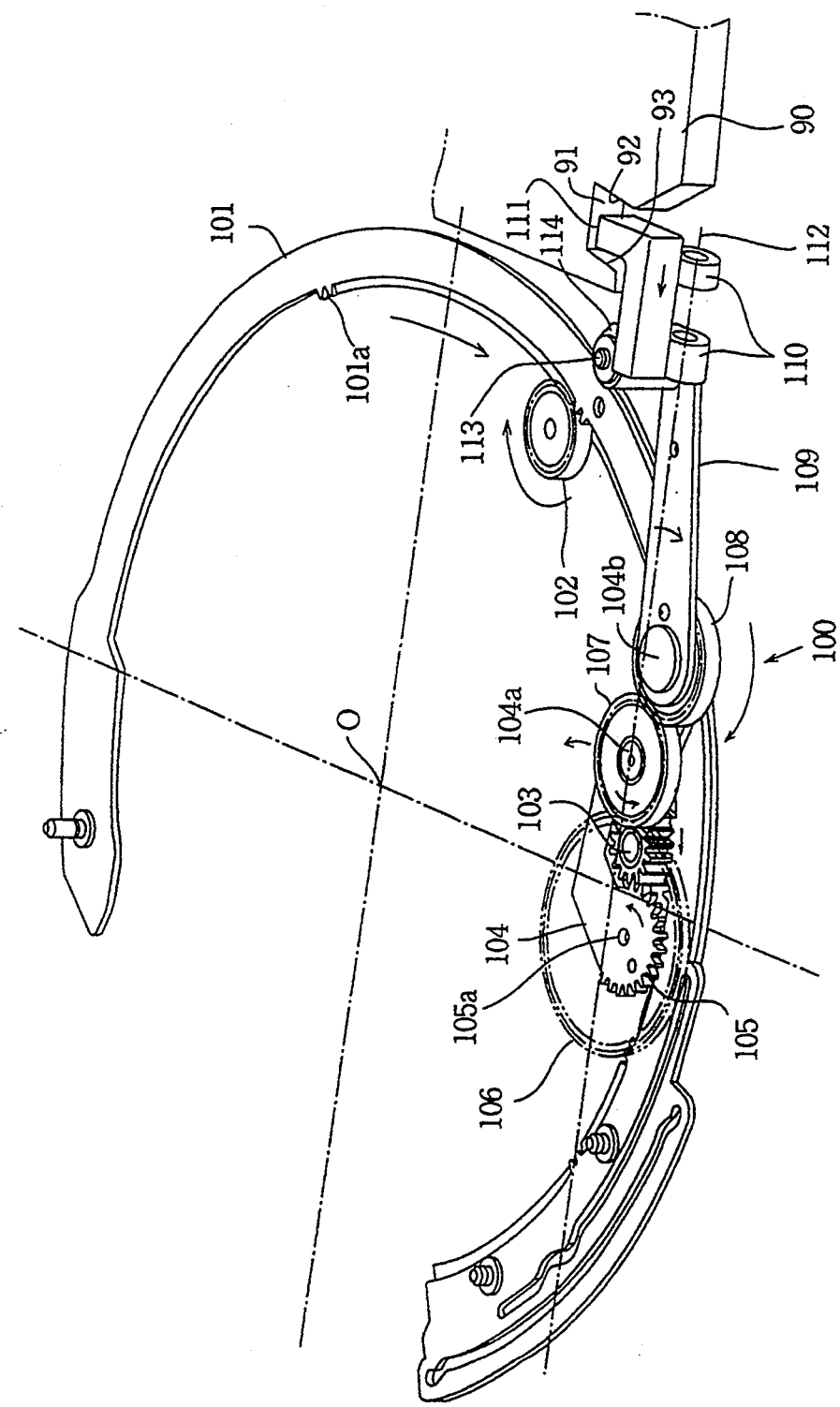
FIG. 1 is a perspective view showing a tray loading device of a CD player according to the present invention.
Figure 2:
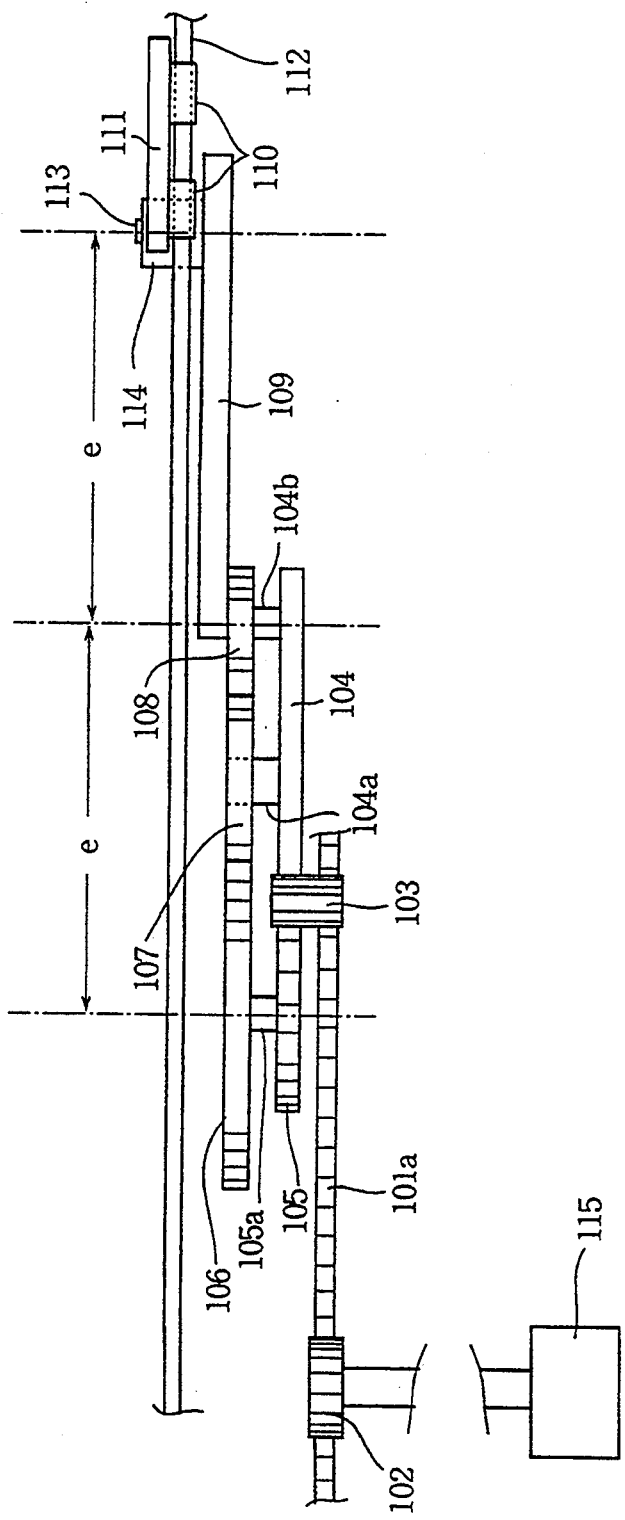
FIG. 2 is a side view of the device.

Referring to FIGS. 1 and 2 showing a tray loading device 100 of the present invention, a drive gear 102 is secured to a rotating shaft of a motor 115 and engaged with a gear portion 101a of a mode control ring 101 for rotating it about a center 0. The gear portion 101a is further engaged with a pinion 103 which is engaged with a gear 105 of a gear arm 104. The gear 105 is rotatably mounted on a shaft 105a to which a fixed gear 106 is secured. The gear 106 is engaged with an intermediate gear 107 rotatably mounted on a shaft 104a secured to the gear arm 104 at a central portion thereof. The gear 107 is engaged with a gear 108 rotatably mounted on a shaft 104b secured to an end portion of the arm 104.

In the relationship between the gears 106 and 108, if the number of teeth of the gear 106 is Z1 and the number of teeth of the gear 108 is Z2, the number Z1 is double Z2 (Z1=2Z2). The number of teeth of the gear 107 is properly set.

On the shaft 104b, a tray loading arm 109 pivotally mounted at a base thereof. The arm 109 is provided with a holding member 114 rotatably mounted on a shaft 113 secured to an end portion thereof. A tray guide 111 is integrally formed on the holding member 114 to be engaged with a notch 91 of a tray 90. A pair of guide members 110 are formed on an underside of the guide 111 and slidably mounted on a guide shaft 112.

Figure 4:
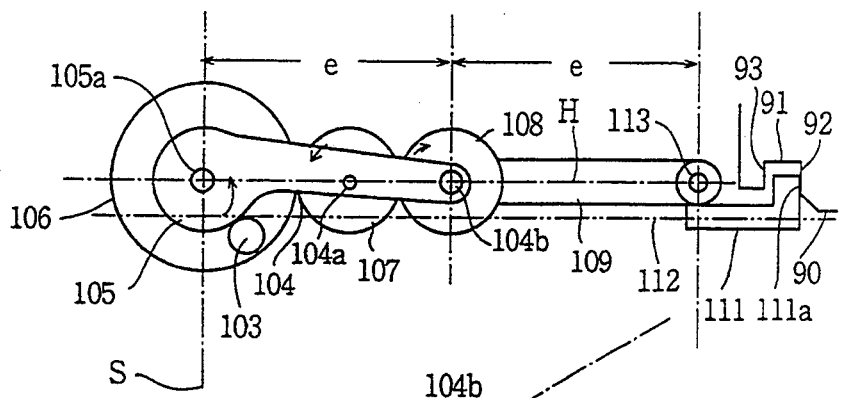
FIG. 4a, 4b, 4c and 4d are explanatory plan views showing the operation of the device.
Figure 4:
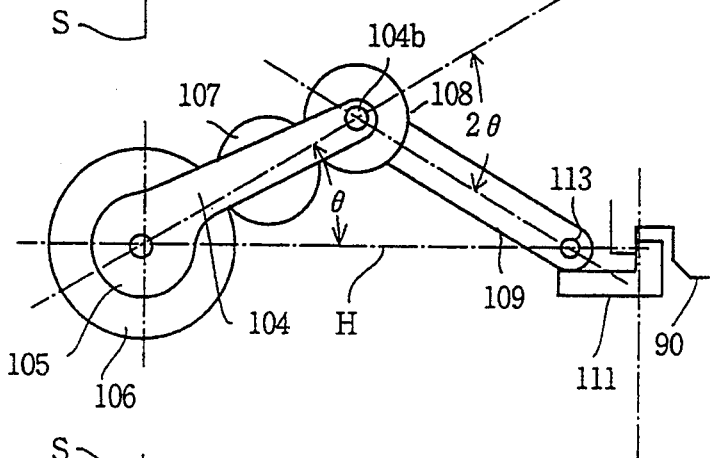
Figure 4:
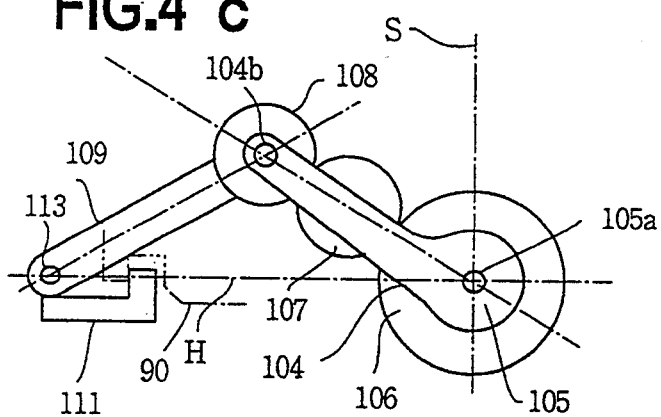
Figure 4:
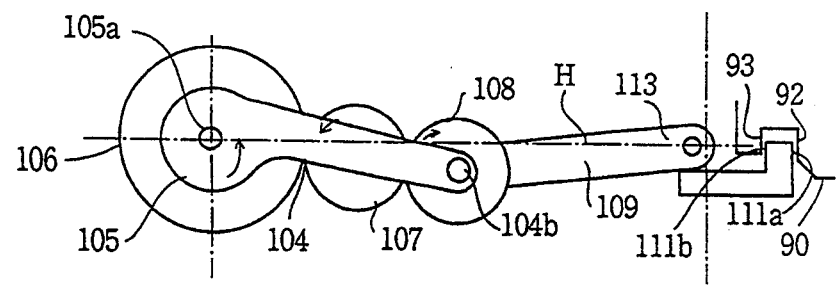
Figure 5:
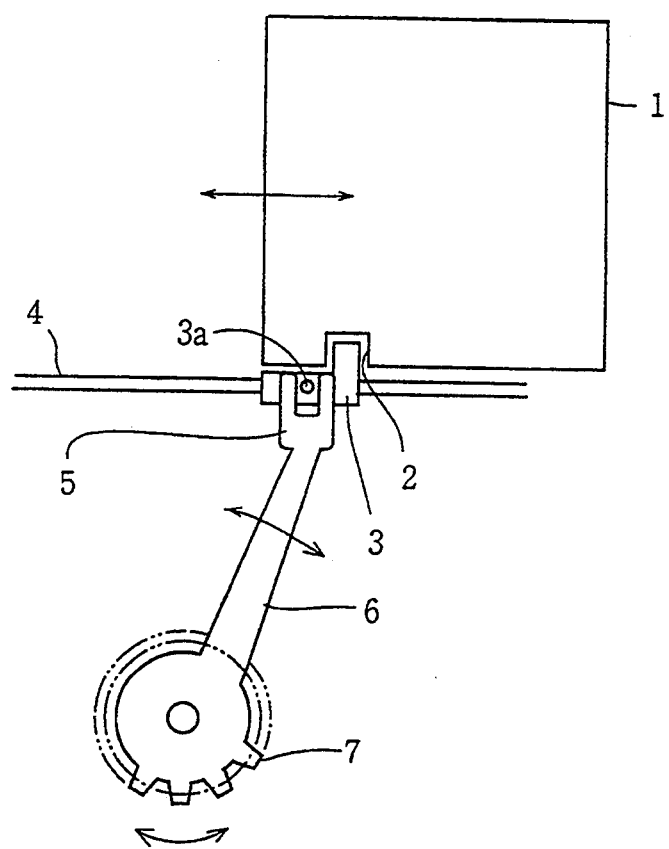
FIG. 5 is a plan view of a conventional tray loading device.

As shown in FIG. 2, the length e between the shafts 105a and 104b is equal to the length e between the shafts 104b and 113. Thus, the gear arm 104 and the tray loading arm 109 approximately have the same length. As shown in FIG. 4a, the shaft 112 is parallel to the line H connecting the shafts 105a, 104b and 113 positioned on a straight line.

Figure 3:
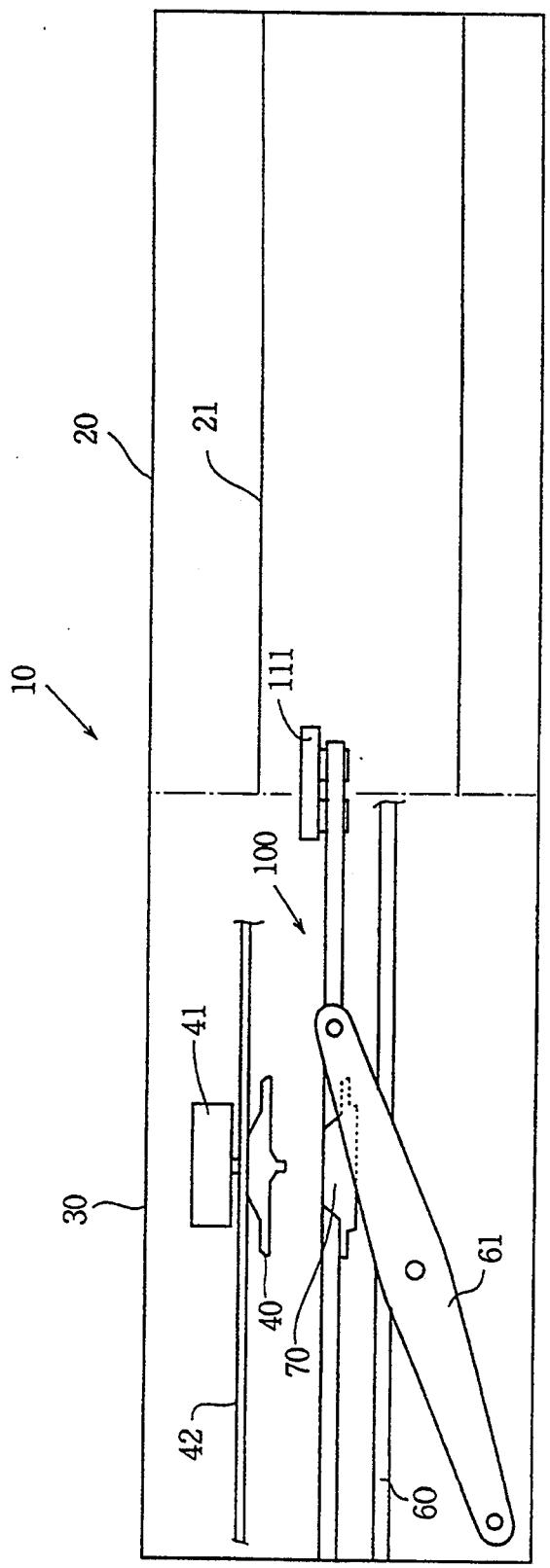
FIG. 3 is a sectional side view schematically showing the CD player.

FIG. 3 shows a car CD player 10 having the tray loading device 100. The car CD player 10 has a magazine mounting section 20 having a magazine housing 21 and a reproducing device 30. The reproducing device 30 comprises a frame 42 on which a turntable 40 driven by a spindle motor 41 is rotatably mounted. The tray loading device 100 is mounted on a frame 60 which is provided on a lower portion of the frame 42 and vertically movable by an arm 61 operated by a motor (not shown). A clamper 70 is also mounted on the frame 60 for clamping a CD on the turntable 40.

The operation of the tray loading device 100 will be described with reference to FIGS. 4a to 4d.

When the tray 90 is pushed into the magazine, a side 111a of the guide 111 is engaged with an inside wall 92 of the notch 91 as shown in FIG. 4a. Under such a condition where the side 111a abuts on the wall 92, the loading device can not be smoothly vertically moved. Therefore, as described later, at the selection of one of trays in the magazine, the loading device is positioned as shown in FIG. 4d. Namely, both sides 111a and 111b of the tray guide 111 are disengaged from inside walls 92 and 93 of the notch 91.

When one of the trays in the magazine is selected, the tray loading device 100 is vertically moved in the player along the trays in the magazine to the selected tray. Since the guide 111 does not touch the wall of the notch 91, the device can be smoothly moved.

In order to draw the selected tray from the magazine, the motor 115 is driven to rotate the gear 102 in the clockwise direction shown by an arrow of FIG. 1, so that the mode control ring 101 is rotated in the clockwise direction to rotate the pinion 103 in the clockwise direction. The gear 105 of the gear arm 104 engaged with the pinion 103 is rotated in the counterclockwise direction. Thus, the arm 104 is moved in the counterclockwise direction about the shaft 105a. When the arm 104 is moved, the gear 107 rotatably mounted on the arm 104 is revolved around the gear 106 to be rotated in the counterclockwise direction. The gear 108 engaged with the gear 107 is rotated in the clockwise direction to move the arm 109 in the clockwise direction. At the position of FIG. 4a, the axes of the arms 104 and 109 are come into line, the tray guide 111 is engaged with the wall 93 of the notch 91 of the tray 90.

As shown in FIG. 4b, when the ring 101 is further rotated, the arm 104 is moved in the counterclockwise direction through the pinion 103 and the gear 105. The arm 109 is moved in the clockwise direction through the gears 107 and 108. Thus, the tray guide 111 mounted on the shaft 113 of the arm 109 is moved along the guide rail 112 so that the selected tray 90 is gradually drawn from the magazine.

In accordance with the gear ratio of the gear 106 to the gear 108, if the arm 104 is rotated at an angle $\theta$ with the line H, the arm 109 is rotated at an angle $2\theta$ with the axis of the arm 104 in the opposite angular direction.

When the arm 104 is overlapped on a perpendicular axis S and the shaft 104b of the arm 104 coincides with the axis S, the arm 109 is overlapped on the arm 104 and the shaft 113 of the arm 109 coincides with the shaft 105a of the gear 105 because the arms 104 and 109 are the same length. The gear 107 is further revolved around the gear 106 so that the arm 109 is crossed over the arm 104 and moved to the left as shown in FIG. 4c. When the arms 104 and 109 are come into line, the tray 90 is completely fed to the reproducing device 30 and further loaded on the turntable 40.

In order to return the tray to the magazine when selecting the other tray, the ring 101 is rotated in the counterclockwise direction through the gear 102 and motor 115. The gear 105 is rotated in the clockwise direction to move the arm 104 in the clockwise direction. The gear 108 is rotated in the counterclockwise direction to move the arm 109 in the counterclockwise direction. The tray guide 111 engaged with the notch 91 of the tray is abutted on the wall 92 so as to push the tray to the magazine as the arms 104 and 109 are moved. The return operation is continued in a reverse order. When the arms 104 and 109 are moved to the positions as shown in FIG. 4a, the tray 90 is returned in the magazine. However, the ring 101 is further rotated a predetermined small angle in the counterclockwise direction to move the arm 104 in the clockwise direction. Thus, the shaft 104b is positioned slightly lower than the line H to move the shaft 113 as shown in FIG. 4d. The guide 111 is positioned in a center of the notch 91 such that a gap is provided between the guide 111 and walls 92 and 93. Consequently, the device 100 can be smoothly moved at the next selection of the tray.

In accordance with the present invention, since the tray loading arm is overlapped on the gear arm at a maximum laterally projected position during the loading operation, the length of the overlapped arms is a half of the length of arms when stretched. Thus, the space for operating the device is reduced so that the size of the CD player can be reduced.

In order to disengage the tray guide from the wall of the notch of the tray, the gear arms is additionally moved in the same direction as the return operation of the tray. Thus, the operation of the device at the change of the tray is simplified.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tray loading device of a CD player having a magazine storing a plurality of trays each of which holds a CD, the loading device comprising:
   a fixed gear having a number of teeth;
   a first gear coaxial with said fixed gear and rotatable thereon;
   a first arm integral with said first gear;
   a second gear rotatably mounted on said first arm and meshingly engaged with said fixed gear so as to revolve around the fixed gear, said second gear having a number of teeth;
   a third gear rotatably mounted on said first arm at an end portion thereof and meshingly engaged with said second gear;
   a second arm secured to said third gear;
   a tray guide provided on said second arm at an end portion thereof so as to be engaged with one of said trays;
   guide means provided for moving said tray guide along a line; and
   driving means for rotating the first gear, wherein the first arm is rotated in one of two rotating directions by the revolution of the first gear and the second arm is rotated in the other direction by the revolution of the second gear.

2. The device according to claim 1 wherein a length of said first arm is equal to a length of said second arm.

3. The device according to claim 1 wherein the number of teeth of the second gear is half of that of the fixed gear.

* * * * *